United States Patent
Kim

(12) 
(10) Patent No.: US 6,567,401 B1
(45) Date of Patent: May 20, 2003

(54) SEPARATE STRUCTURE OF A DATAPATH LAYER AND A PHYSICAL LAYER WITHIN AN ACCESS NETWORK LOADED WITH A V5.2 PROTOCOL IN A WIRELESS COMMUNICATION SYSTEM AND COMMUNICATION METHOD BETWEEN TWO BOARDS RESPECTIVELY HAVING THE DATAPATH LAYER AND THE PHYSICAL LAYER

(75) Inventor: Yeon Song Kim, Seoul (KR)

(73) Assignee: Hyundai Electronics Ind. Co., Ltd., Ichon-Si (KR)

( * ) Notice: Subject to any disclaimer, the term of this patent is extended or adjusted under 35 U.S.C. 154(b) by 0 days.

(21) Appl. No.: 09/422,183

(22) Filed: Oct. 22, 1999

(30) Foreign Application Priority Data

Oct. 29, 1998 (KR) .............................. 98-45931

(51) Int. Cl.$^7$ .............................................. H04L 12/66
(52) U.S. Cl. ........................ 370/352; 370/469; 370/349
(58) Field of Search ................................ 370/351, 431, 370/434, 401, 338, 349, 346, 352, 356, 464–469, 389, 310

(56) References Cited

U.S. PATENT DOCUMENTS

| | | | |
|---|---|---|---|
| 4,903,262 A | | 2/1990 | Dissosway et al. |
| 5,265,093 A | | 11/1993 | Dissosway et al. |
| 5,802,285 A | | 9/1998 | Hirviniemi |
| 5,889,778 A | * | 3/1999 | Huscroft et al. ....... 370/395.31 |
| 6,154,464 A | * | 11/2000 | Feuerstraeter et al. ...... 370/463 |
| 6,163,569 A | * | 12/2000 | Flanagan ..................... 375/222 |

* cited by examiner

Primary Examiner—Ajit Patel
Assistant Examiner—Raj Jain
(74) Attorney, Agent, or Firm—Jacobson Holman PLLC

(57) ABSTRACT

There is disclosed a separate structure of a datapath layer and a physical layer within an access network loaded with a V 5.2 protocol in a wireless communication system and communication method between two boards respectively having the datapath layer and the physical layer, which separately forms the protocol board with the datapath layer and the physical layer board section including the multiple physical layer boards with the multiple physical layers and connects the separate two entities using the routing section to allow a protocol to be transmitted and received between the two entities, thereby facilitating the designing of the V5.2 protocol board, the extension of the system and the execution of dualization function of the V5.2 LAYER 3.

7 Claims, 4 Drawing Sheets

SEPARATE STRUCTURE OF A DATAPATH LAYER AND A PHYSICAL LAYER WITHIN AN ACCESS NETWORK LOADED WITH A V5.2 PROTOCOL IN A WIRELESS COMMUNICATION SYSTEM AND COMMUNICATION METHOD BETWEEN TWO BOARDS RESPECTIVELY HAVING THE DATAPATH LAYER AND THE PHYSICAL LAYER

BACKGROUND OF THE INVENTION

1. Field of the Invention

The present invention relates to an access network loaded with a V5.2 protocol in a wireless communication system and more particularly to a separate structure in which a datapath layer and a physical layer are separately loaded onto different boards in the access network loaded with the V5.2 protocol and to a method of communicating a protocol between the two boards respectively loaded with the separate physical and datapath layers.

2. Description of Related Art

Generally, a V5.2 protocol is a signaling interface rule between a system controller and a switching center in a wireless communication system. According to the V5.2 protocol, maximum 16 E1 links (1048 Kbps) each having a transmission rate of 128 Kbps can be used in a single interface and a protocol for protection of communication channels exists when more than one link is used.

The following explain concerns a connection structure between a public switched telephone network (PSTN) switching center and the access network loaded with the V5.2 protocol in the wireless communication system according to a prior art.

FIG. 1 shows the connection structure between the PSTN switching center and the access network loaded with the V5.2 protocol in the wireless communication system according to the prior art. An access network board 10 loaded with the V5.2 protocol is divided into a LAYER 3 110, a data link management layer 120, a datapath layer 130 and a physical layer 140.

The physical layer 140 of the access network board 10 is connected to a PSTN switching center 400 via 16 E1 links. Here, the LAYER 3 110 of the access network board 10 is composed of multiple protocols.

The multiple protocols comprises: a call process channel allocation section 111 for allocating a call process channel; an E1 link switching controller 113 for switching from a selected E1 link to another E1 link when the selected E1 link is out of order; an E1 link controller 115 for blocking or unblocking the E1 link according to a command of a manager; a user port management section 117 for managing a user port connected to the access network board 10; and a voice channel allocation section 119 for allocating a voice channel.

The data link management layer 120 of the access network board 10 manages data link (E1 link) connection with the PSTN switching center 400 and controls flow of data transmission according to a command of each protocol.

The datapath layer 130 of the access network board 10 supports relay mechanism with respect to protocol messages of the LAYER 3 110. The physical layer 140 is a transmission device for transmitting and receiving the protocols between the datapath layer 130 and the PSTN switching center 400 via the E1 links.

Although the V5.2 protocol provides maximum 16 E1 links per interface board according to the prior art, it is nearly impossible to design a system such that all the links are implemented in one board when the V5.2 protocol is actually applied to the system. In other words, according to the conventional access network board 10 loaded with the physical layer 140 connected to the E1 link, two E1 links are connected to one physical layer 140. To cover the 16 E1 links, the access network board 10 needs 8 physical layer boards. However, only two or three physical layer boards can be disposed per access network board 10 in an aspect of actually designing the physical layer 140 board.

SUMMARY OF THE INVENTION

Accordingly, the present invention is directed to a separate structure of a datapath layer and a physical layer within an access network loaded with a V5.2 protocol in a wireless communication system and a communication method between two boards separately having the datapath layer and the physical layer that substantially obviates one or more of the limitations and disadvantages of the related art.

An objective of the present invention is to provide a separate structure of a datapath layer and a physical layer within an access network loaded with a V5.2 protocol in a wireless communication system, wherein the datapath layer and the physical layer are separated in the access network board loaded with the V5.2 protocol and the separated datapath and physical layers are connected using a router, thereby facilitating the designing of the access network board loaded with the V5.2 protocol.

Another objective of the present invention is to provide a method of communicating protocol messages between a board with the datapath layer and a board with the physical layer.

Additional features and advantages of the invention will be set forth in the following description, and in part will be apparent from the description, or may be learned by practice of the invention. The objectives and other advantages of the invention will be realized and attained by the structure as illustrated in the written description and claims hereof, as well as the appended drawings.

To achieve these and other advantages, and in accordance with the purpose of the present invention as embodied and broadly described, in a connection structure between a PSTN switching center and a V5.2 protocol access network including a protocol board comprising a datapath layer and a plurality of physical layers, a separate structure of a datapath layer and a physical layer within the access network loaded with the 5.2 protocol in the wireless communication system, comprises: a plurality of physical layer boards with the plurality of physical layers separated from the protocol board and connected to the PSTN switching center via a plurality of E1 links; a routing section disposed between a group of the multiple physical layer boards and the protocol board with the datapath layer, for designating a protocol transmission path between the datapath layer in the protocol board and one of the multiple physical layer boards and for routing packet data including a protocol message between the designated physical layer board and the protocol board; and a controller for providing a control signal to the routing section to allow the packet data to be routed to the designated physical layer board or the protocol board via the routing section.

In another aspect of the present invention, a method of communicating a protocol between a protocol board having a datapath layer and one of multiple physical layer boards having multiple physical layers, comprises: a forward communication step of transmitting a packet including a message requesting connection, information designating an E1 link and a protocol message to the physical layer board via the routing section and determining whether or not an E1 link corresponding to the information designating the E1 link contained in the packet is normal so as to transmit the protocol message to the PSTN switching center via the corresponding E1 link if the corresponding E1 link is determined to be normal; and a reverse communication step of receiving a protocol message from the PSTN switching center via the corresponding designated E1 link and forming a packet for the protocol message if the received protocol message is normal so as to transmit the normal protocol message to the datapath layer in the protocol board via the routing section.

The forward communication step comprises the steps of: transmitting the packet including a destination address, a source address and the E1 link designating information from the protocol board to the physical layer board via the routing section for request of connection; activating an E1 link corresponding to the designating information contained in the transmitted packet and determining whether or not the corresponding E1 link is stable; forming a packet including state information denoting that the corresponding E1 link is stable and transmitting the packet including the state information of the corresponding E1 link to the protocol board via the routing section if the corresponding E1 link is determined to be stable; forming a packet including the protocol message to transmit it to the physical layer board via the routing section if the protocol board receives the packet including the state information of the corresponding E1 link; transmitting the protocol message contained in the packet to the PSTN switching center via the corresponding designated E1 link if the packet including protocol message is received by the physical layer board; and transmitting a packet including information denoting that transmission of the protocol message has been completed to the protocol board via the routing section if the transmission of the protocol message to the PSTN switching center is completed.

The reverse communication step comprises the steps of: receiving the protocol message and determining whether or not the protocol message is normal if the protocol message is transmitted from the PSTN switching center via the designated E1 link to the physical layer board connected to the designated E1 link; forming the packet by adding a header and an identifier to the protocol message if the received protocol message is determined to be normal and transmitting the packet to the protocol board. via the routing section; and analyzing the packet transmitted from the physical layer board to identify the identifier and the protocol message contained in the transmitted packet.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

Figure 4:
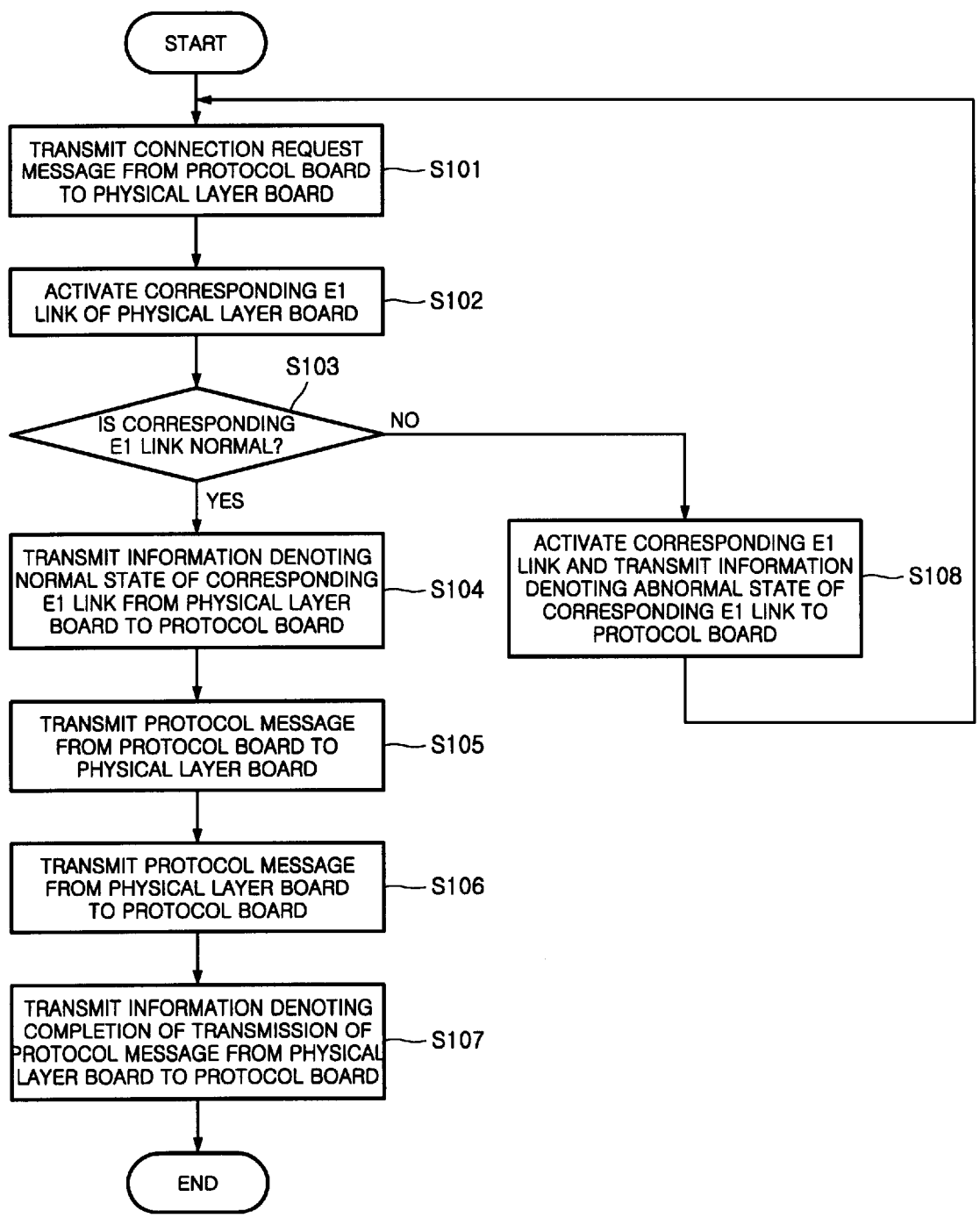
Figure 5:
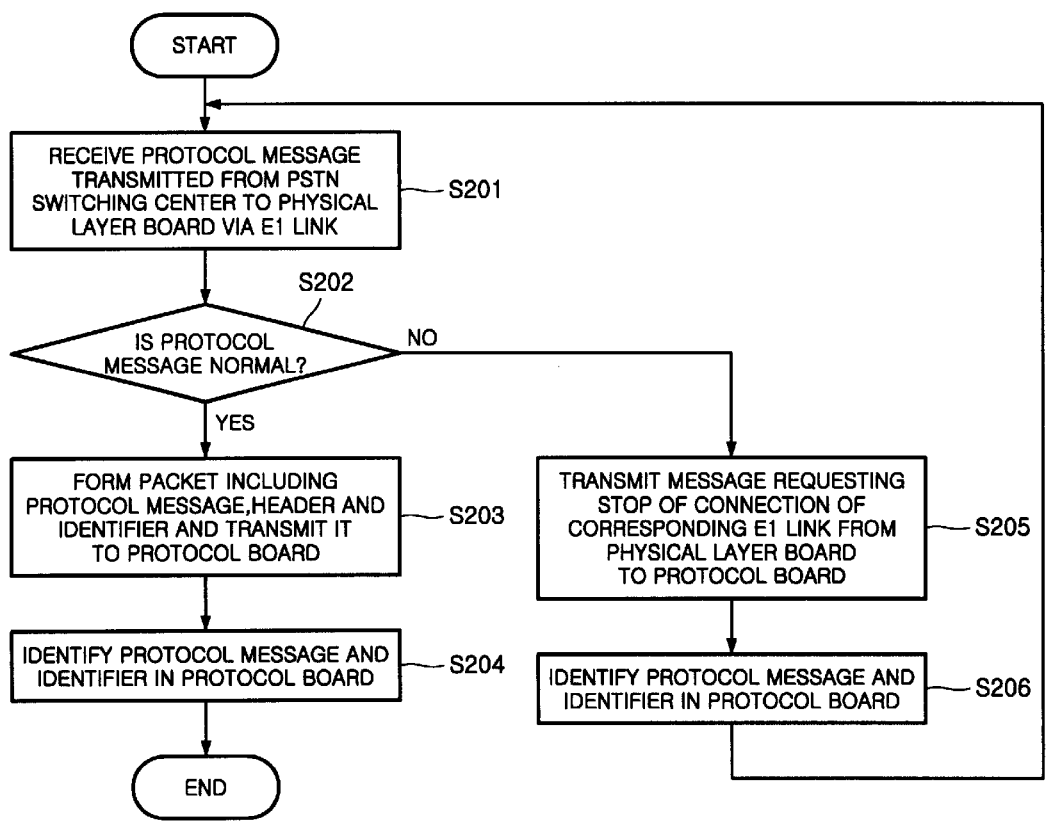

FIG. 4 is a flow chart showing a communication method from the protocol board with the datapath layer to the physical layer board with the physical layer in the access network loaded with the V5.2 protocol in a wireless communication system according to the present invention; and FIG. 5 is a flow chart showing a communication method from the physical layer board with the physical layer to the protocol board with the datapath layer in the access network loaded with the V5.2 protocol in a wireless communication system according to the present invention.

DETAILED DESCRIPTION OF PREFERRED EMBODIMENT

Reference will now be made in detail to the preferred embodiments of the present invention, examples of which are illustrated in the accompanying drawings.

With reference to the accompanying drawings, the separate structure of a datapath layer and a physical layer within an access network loaded with a V5.2 protocol in a wireless communication system according to the present invention will now be described in detail.

Figure 1:
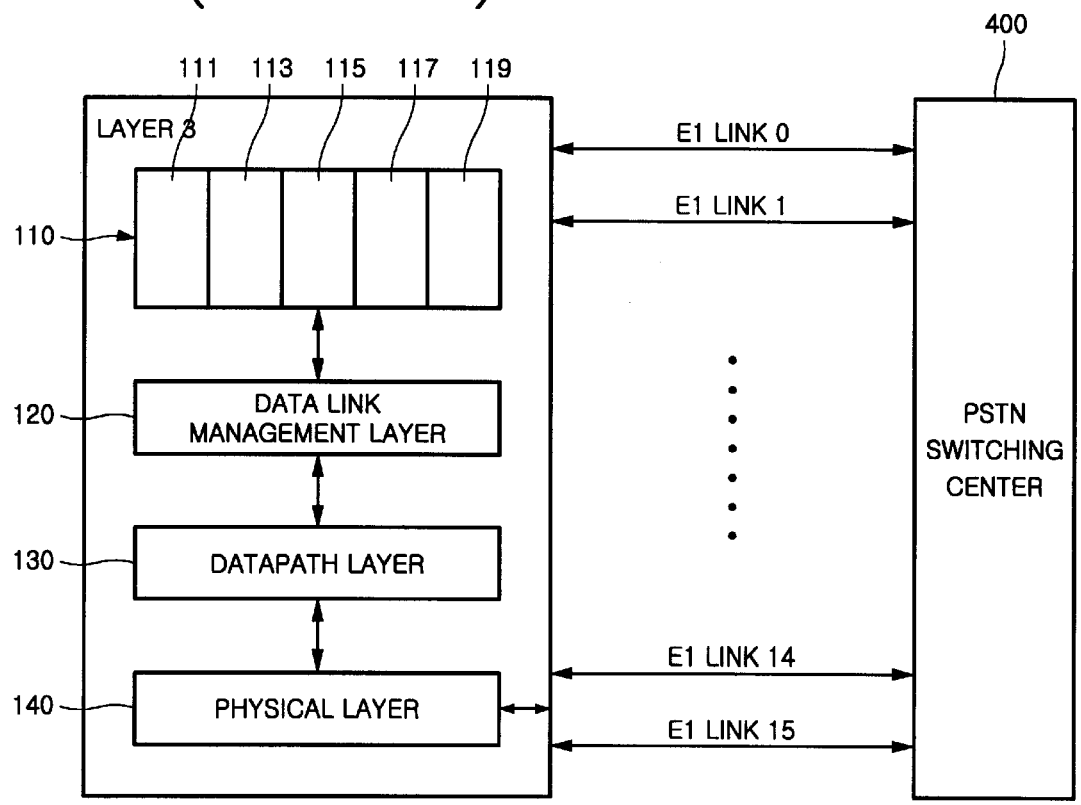
FIG. 1 shows a connection structure between a PSTN switching center and an access network loaded with a V5.2 protocol in a conventional wireless communication system.
Figure 2:
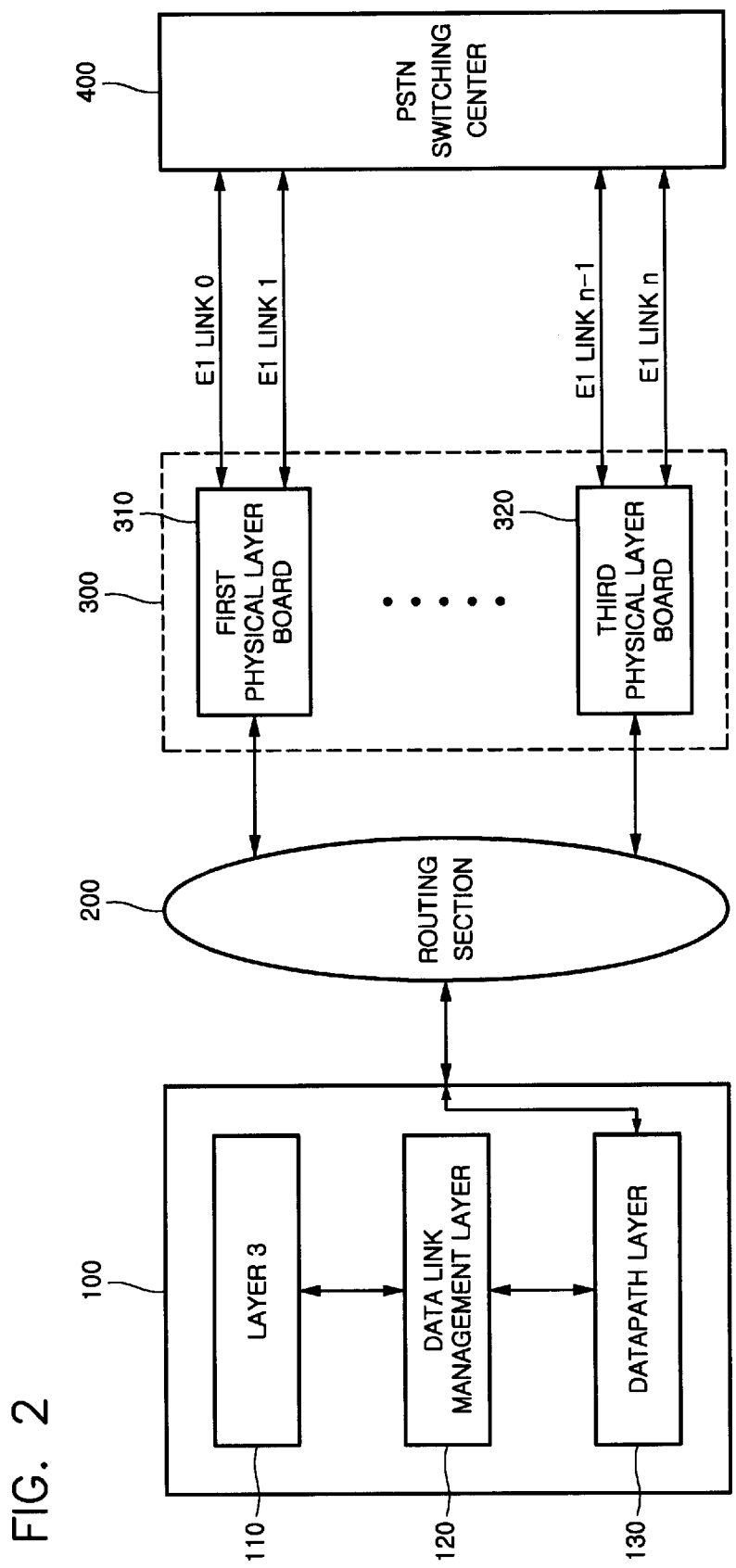
FIG. 2 shows a separate structure of a datapath layer and a physical layer within an access network loaded with the V5.2 protocol in a wireless communication system according to the present invention.

FIG. 2 shows a separate structure of the datapath layer and the physical layer within the access network loaded with the V5.2 protocol in the wireless communication system according to the present invention. The same reference number will be given to the same element as the conventional one depicted in FIG. 1.

As shown in FIG. 2, the separate structure of the present invention comprises: a protocol board 100 including the LAYER 3 110, the data link management layer 120 and the datapath layer 130; a physical layer board section 300 consisting of a plurality of physical layer boards with physical layers, connected to the PSTN switching center via a plurality of E1 links 0 to n; a routing section 200 connected between the datapath layer 130 in the protocol board 100 and the physical layer board section 300, for designating a protocol transmission path between the physical layer board section 300 and the datapath layer 130 to route a protocol message between the physical layer board section 300 and the datapath layer 130 according to a supplied control signal; and a control device (not shown) for providing the control signal to the routing section 200 to allow the protocol message to be communicated between the physical layer board section 300 and the datapath layer 130.

Each of the multiple physical layer boards 310 and 320 is provided with two E1 links. Specifically, the first physical layer board 310 is connected to the PSTN switching center 400 via the E1 links 0 and 1 and the N-th physical layer board 320 is connected to the PSTN switching center 400 via the E1 links n−1 and n.

The datapath layer 130 in the V5.2 protocol board 100 relays the protocol message generated in the LAYER 3 110 to the physical layer board section 300 via the routing section 200. The routing section 200 routes the protocol between the protocol board 100 and the physical layer board section 300 according to the control signal applied from the control device.

Figure 3:
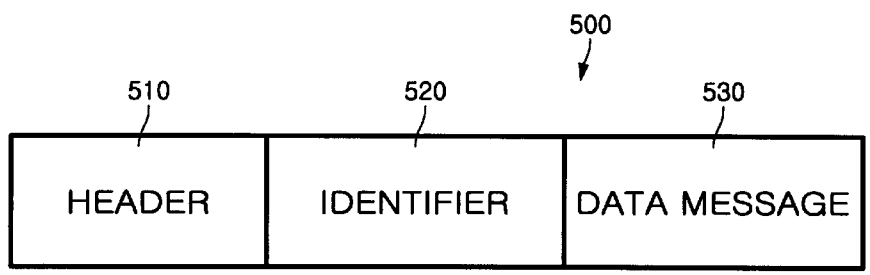
FIG. 3 shows a structure of a packet communicated between the protocol board and the physical layer board depicted in FIG. 2.

The structure of a packet transmitted and received between the protocol board 100 and physical layer board section 300 via the routing section 200, as shown in FIG. 3, comprises a header 510 indicating destination and source addresses, an identifier 520 indicating a command transmitted between the protocol board 100 and the physical layer board section 300 and a designating number of an E1 link, and a data message 530 indicating a protocol message. The header 510 includes the destination address, the source address, user information used for distinguishing the V5.2 in OS and an entire length of the protocol message to be transmitted.

In addition to the designated E1 link number, the identifier 520 may include a connection request message transmitted from the datapath layer 130 in the protocol board 100 to the physical layer board section 300, a connection confirmation message transmitted from the physical layer board section 300 to the datapath layer 130 in the protocol board 100, a data request message transmitted from the datapath layer 130 in the protocol board 100 to the physical layer board section 300, a disconnection indication message transmitted from the physical layer board section 300 to the datapath layer 130 in the protocol board 100, a data indication message transmitted from the physical layer board section 300 to the datapath layer 130 in the protocol board 100, and a data confirmation message transmitted from the physical layer board section 300 to the datapath layer 130 in the protocol board 100.

With reference to FIG. 4 and FIG. 5, in the above described structure where the protocol board 100 and the physical layer board section 300 are separated and connected via the routing section 200, a communication method between the protocol board 100 and the physical layer board section 300 will be described.

FIG. 4 is a flow chart showing a communication method from the protocol board with the datapath layer to the physical layer board with the physical layer in the access network loaded with the V5.2 protocol in the wireless communication system according to the present invention. FIG. 5 is a flow chart showing a communication method from the physical layer board with the physical layer to the protocol board with the datapath layer in the access network loaded with the V5.2 protocol in the wireless communication system according to the present invention.

The communication method between the protocol board with the datapath layer and the physical layer board with the physical layer in the access network loaded with the V5.2 protocol of the wireless communication system according to the present invention is divided into two types: a forward communication method where a packet including information for requesting connection, a designated E1 link number and a protocol message is transmitted from the protocol board 100 via the routing section 200 to the physical layer board section 300 and the packet transmitted to the physical layer board section 300 is analyzed to transmit the protocol message to the PSTN switching center 400 via the designated E1 link when the designated E1 link is stable; and a reverse communication method where, once a protocol message is transmitted from the PSTN switching center 400 via a designated E1 link to the physical layer board section 300, a packet including the protocol message is transmitted to the protocol board 100 via the routing section 200 depending when the transmitted protocol message is normal.

With reference to FIG. 4, the forward communication method, that is, the method of transmitting a protocol message from the protocol board 100 to the designated one of the multiple physical layer boards in the physical layer board section 300 via the routing section 200, will be described in detail. Here, the designated physical layer board is assumed to be the first physical layer board 310.

Primarily, a packet including information requesting the connection to the E1 link 0 is transmitted from the datapath layer 130 in the protocol board 100 to the first physical layer board 310 via the routing section 200 (S101).

Subsequently, the first physical layer board 310 receives the packet including the information requesting the connection to the E1 link 0 transmitted from the datapath layer 130 in the protocol board 100 and analyzes the received packet, whereby activating the E1 link 0 (S102).

Once the E1 link 0 is activated, the first physical layer board 310 determines whether or not the E1 link 0 is normal, namely, stable (S103). At this time, whether or not the E1 link is stable is determined by a flag monitoring method.

If the determination proves that the E1 link 0 is stable, the first physical layer board 310 transmits a packet including information denoting the stableness of the E1 link 0 to the datapath layer 130 in the protocol board 100 via the routing section 200 (S104).

Next, the datapath layer 130 in the protocol board 100 analyzes the packet including the information on the state of the E1 link transmitted from the first physical layer board 310 via the routing section 200 and then transmits a packet including a protocol message to the first physical layer board 310 via the routing section 200 (S105).

Accordingly, the first physical layer board 310 transmits the protocol message to the PSTN switching center via the E1 link 0 (S106). If the transmission of the protocol message is completed, subsequently, the first physical layer board 310 transmits a packet including information denoting that the protocol message has been transmitted to the PSTN switching center 400 via the E1 link 0 in stable to the datapath layer 130 in the protocol board 100 (S107), thereby completing the forward transmission.

Alternately, if the determination at the step S103 proves that the E1 link 0 is unstable, the first physical layer board 310 inactivates the E1 link 0 and transmits a packet including information denoting the unstableness of the E1 link 0 to the datapath layer 130 in the protocol board 100 (S108). Subsequently, the protocol board 100 designates another E1 link to newly perform the forward transmission starting from the step S101.

With reference to FIG. 5, the reverse communication method of transmitting a protocol message from the first physical layer board 100 to the protocol board 100 will be described in detail.

First, once a protocol message is transmitted from the PSTN switching center 400 via the E1 link 0 to a designated physical layer board, e.g., the first physical layer board 310, of the multiple physical layer boards in the physical layer board section 300, the first physical layer board 310 determines whether or not the protocol message transmitted from the PSTN switching center 400 via the E1 link 0 is normal (S202).

If the determination proves that the protocol message is normal, the first physical layer board 310 adds a header and an identifier to the protocol message transmitted from the PSTN switching center 400 via the E1 link 0 to form a packet and transmits the packet to the datapath layer 130 in the protocol board 100 via the routing section 200 (S203).

Subsequently, the datapath layer 130 in the protocol board 100 analyzes the packet received via the routing section 200 to identify the identifier and the protocol message (S204).

Alternately, if the determination at the step S202 proves that the protocol message is not normal, the first physical layer board 310 transmits a packet including information requesting the stop of the connection to the E1 link 0 to the datapath layer 130 in the protocol board 100 via the routing section 200 (S205). The protocol board 100 then inactivates the E1 link 0 in response to the received packet (S206).

In the above description on the protocol message transmission between the protocol board 100 and the physical layer board section 300, the first physical layer board 310 and the E1 link 0 are examined, but the same processes are carried out with respect to the other physical layer boards and E1 links, so the detailed description will be omitted. In other words, among the multiple physical layer boards 310 to 320 in the physical layer board section 300 and the multiple E1 links 0 to n connected to the multiple physical layer boards, a designated physical layer board and one of the two E1 links connected to the designated physical layer board are selected for the communication with the protocol board 100.

As illustrated above, the present invention separately forms the protocol board with the datapath layer and the physical layer board section including the multiple physical layer boards with the multiple physical layers and connects the separate two entities using the routing section to allow a protocol to be transmitted and received between the two entities, thereby facilitating the designing of the V5.2 protocol board, the extension of the system and the execution of dualization function of the V5.2 LAYER 3.

It will be apparent to those skilled in the art that various modifications and variations can be made in the separate structure of a datapath layer and a physical layer within an access network loaded with a V5.2 protocol in a wireless communication system and communication method between two boards respectively having the datapath layer and the physical layer of the present invention without deviating from the spirit or scope of the invention. Thus, it is intended that the present invention covers the modifications and variations of this invention provided they come within the scope of the appended claims and their equivalents.

What is claimed is:

1. In a connection structure between a public switched telephone network (PSTN) switching center and a V5.2 protocol access network including a protocol board comprising a datapath layer and a plurality of physical layers, a separate structure of a datapath layer and a physical layer within the access network loaded with the 5.2 protocol in the wireless communication system, the separate structure comprising:

a plurality of physical layer boards with the plurality of physical layers separated from the protocol board and connected to the PSTN switching center via a plurality of E1 links;

a routing section disposed between a group of the multiple physical layer boards and the protocol board with the datapath layer, for designating a protocol transmission path between the datapath layer in the protocol board and one of the multiple physical layer boards and for routing packet data including a protocol message between the designated physical layer board and the protocol board; and control means for providing a control signal to the routing section to allow the packet data to be routed to the designated physical layer board or the protocol board via the routing section.

2. The separate structure as specified in claim 1, wherein the packet data routed to the designated physical layer board or the protocol board via the routing section comprises:

a header including a destination address, source address and entire length of the protocol message to be transmitted;

an identifier properly including information designating an E1 link between the physical layer board and the protocol board, a connection request message transmitted from the protocol board to the physical layer board, a connection confirmation message transmitted from the physical layer board to the protocol board, a data request message transmitted from the protocol board to the physical layer board, a disconnection indication message transmitted from the physical layer board to the protocol board, a data indication message transmitted from the physical layer board to the protocol board, and a data confirmation message transmitted from the physical layer board to the protocol board; and a data message including the protocol message transmitted and received between the physical layer board and the protocol board.

3. A method of communicating a protocol between a protocol board having a datapath layer and one of multiple physical layer boards having multiple physical layers, which are connected to the protocol board via a routing section and to a PSTN switching center via a plurality of E1 links, the two kinds of boards being within an access network loaded with a V5.2 protocol in a wireless communication system, the communication method comprising:

a forward communication step of transmitting a packet including a protocol message requesting connection and information designating an E1 link to the physical layer board via the routing section and determining whether or not an E1 link corresponding to the information designating the E1 link contained in the packet is normal so as to transmit the protocol message to the PSTN switching center via the corresponding E1 link if the corresponding E1 link is determined to be normal; and a reverse communication step of receiving a protocol message from the PSTN switching center via the corresponding designated E1 link and forming a packet for the protocol message if the received protocol message is normal so as to transmit the normal protocol message to the datapath layer in the protocol board via the routing section.

4. The communication method as specified in claim 3, wherein the forward communication step comprises the steps of:

transmitting the packet including a destination address, a source address and the E1 link designating information from the protocol board to the physical layer board via the routing section for request of connection;

activating an E1 link corresponding to the designating information contained in the transmitted packet and determining whether or not the corresponding E1 link is stable;

forming a packet including state information denoting that the corresponding E1 link is stable and transmitting the packet including the state information of the corresponding E1 link to the protocol board via the routing section if the corresponding E1 link is determined to be stable;

forming a packet including the protocol message to transmit it to the physical layer board via the routing section if the protocol board receives the packet including the state information of the corresponding E1 link;

transmitting the protocol message contained in the packet to the PSTN switching center via the corresponding designated E1 link if the packet including protocol message is received by the physical layer board; and transmitting a packet including information denoting that transmission of the protocol message has been completed to the protocol board via the routing section if the transmission of the protocol message to the PSTN switching center is completed.

5. The communication method as specified in claim 4, further comprising the steps of:

if the corresponding E1 link is determined to be unstable in the step of determining whether or not the designated E1 link is stable, inactivating the corresponding E1 link and transmitting a packet including information denoting the corresponding E1 link is unstable to the protocol board via the routing section; and designating another E1 link in response to the packet including the state information of the corresponding E1 link and newly performing the forward communication via the another designated E1 link.

6. The communication method as specified in claim 3, wherein the reverse communication step comprises the steps of:

receiving the protocol message and determining whether or not the protocol message is normal if the protocol message is transmitted from the PSTN switching center via the designated E1 link to the physical layer board connected to the designated E1 link;

forming the packet by adding a header and an identifier to the protocol message if the received protocol message is determined to be normal and transmitting the packet to the protocol board via the routing section; and analyzing the packet transmitted from the physical layer board to identify the identifier and the protocol message contained in the transmitted packet.

7. The communication method as specified in claim 6, further comprising the steps of:

if the protocol message is determined to be abnormal in the step of determining whether or not the protocol message is normal, transmitting a packet including a message requesting stop of connection of the corresponding E1 link to the protocol board via the routing section; and inactivating the corresponding E1 link in response to the packet transmitted from the physical layer board.

\* \* \* \* \*